US012750275B2

(12) United States Patent
Kriegel et al.

(10) Patent No.: US 12,750,275 B2
(45) Date of Patent: Sep. 29, 2026

(54) NETWORK DEVICE FOR USE IN A COMMUNICATION NETWORK AND METHOD OF MANUFACTURING A NETWORK DEVICE

(71) Applicant: Turck Holding GmbH, Halver (DE)

(72) Inventors: Thomas Kriegel, Lüdenscheid (DE); Hermann Schwagmann, Detmold (DE)

(73) Assignee: Turck Holding GmbH, Halver (DE)

( * ) Notice: Subject to any disclaimer, the term of this patent is extended or adjusted under 35 U.S.C. 154(b) by 487 days.

(21) Appl. No.: 18/315,650

(22) Filed: May 11, 2023

(65) Prior Publication Data

US 2023/0370329 A1 Nov. 16, 2023

(30) Foreign Application Priority Data

May 12, 2022 (DE) ..................... 10 2022 111 863.0

(51) Int. Cl.
*H04L 41/0806* (2022.01)
*G06F 12/06* (2006.01)

(52) U.S. Cl.
CPC ...... *H04L 41/0806* (2013.01); *G06F 12/0653* (2013.01); *G06F 2212/154* (2013.01); *G06F 2212/2024* (2013.01); *G06F 2212/253* (2013.01)

(58) Field of Classification Search
CPC ............. H04L 41/0806; G06F 12/0653; G06F 2212/154; G06F 2212/2024
See application file for complete search history.

(56) References Cited

U.S. PATENT DOCUMENTS

2011/0247424 A1* 10/2011 Mayr .................... G01L 19/086 73/722
2020/0348652 A1* 11/2020 Kohvakka ............ G05B 19/054

FOREIGN PATENT DOCUMENTS

DE 102004029022 A1 2/2005
DE 102008054829 A1 7/2010
(Continued)

OTHER PUBLICATIONS

European Search Report issued in EP 23 167 290.8, which is a counterpart hereof, mailed Jan. 17, 2024 (English-language machine translation attached).
(Continued)

*Primary Examiner* — Umar Cheema
(74) *Attorney, Agent, or Firm* — Pearl Cohen PartGmbB; Raphael Tautz

(57) ABSTRACT

A network device includes at least one wireless communication device for transmitting data and/or for storing received data by energy received from a transmitting device by induction. The wireless communication device includes or is connected to an ID memory operable by the received energy, in which at least one UAID (unified address identification) can be stored, and which can be read out or (over)written by the wireless communication device. An operating memory is provided, in which an operating data of the network device, which is at least partially necessary for the operation of the network device, can be stored. A method for manufacturing the network device includes assembling the device, storing primary configuration data, generating secondary configuration data, storing the secondary configuration data in a central processing memory, and overwriting the primary configuration data in the network device with the secondary configuration data.

7 Claims, 2 Drawing Sheets

(56) References Cited

FOREIGN PATENT DOCUMENTS

| | | | | | |
|---|---|---|---|---|---|
| DE | 102019217410 | A1 | | 5/2021 | |
| EP | 3226129 | A1 | * | 10/2017 | ............. H04L 67/34 |
| EP | 3005247 | B1 | | 3/2020 | |
| WO | WO-2014197785 | A1 | * | 12/2014 | ............. G05B 15/02 |

OTHER PUBLICATIONS

Search Report issued in DE 10 2022 111 863.0, to which this application claims priority, mailed Mar. 30, 2023 (English-language machine translation attached).

* cited by examiner

NETWORK DEVICE FOR USE IN A COMMUNICATION NETWORK AND METHOD OF MANUFACTURING A NETWORK DEVICE

CROSS REFERENCE TO RELATED APPLICATIONS

This application claims priority to German patent application DE 10 2022 111 863.0 filed on May 12, 2022, which is hereby incorporated by reference in its entirety.

TECHNICAL FIELD

The present disclosure relates to a network device for an automation process using wireless communication and to a manufacturing method for a network device capable of wireless communication.

BACKGROUND

Related art hardware components are known whose operating software offers a high degree of customization or can be regularly overwritten.

For example, DE 10 2019 217 410 A1 discloses a hardware component for a controller in automation technology that has at least one communication interface for communicating with a field device and can be operated in a variety of operating modes. Characteristic operating parameters can be specified for an operating mode, which can be stored in a memory device. Here, the hardware component can be inductively supplied with power via a wireless communication device, which is further suitable and intended for wireless transmission of data, the data being characteristic for the operating parameters.

EP 3 226 129 A1 also describes a device and a method whereby an RFID TAG of a device is queried by means of an RFID reader in order to update RFID-based devices wirelessly. If the device software is not the latest version, a file location for a device software update is transmitted to the RFID TAG of the device by the RFID reader. Finally, a bootloader application running on the device determines that the device update (software) is available and the update is applied.

The individualization or activation by means of characteristic operating parameters or the loading of an update, is still very complex to perform for operating personnel with these devices or according to the procedures mentioned.

SUMMARY

It is an object of the present disclosure to provide an improved hardware and an improved manufacturing method.

This objective is achieved according to the disclosure by a hardware component having a wireless communication device for transmitting and/or for storing received data by energy received from a transmitting device and a method for manufacturing a network device for use in a communication network.

According to the disclosure, the task is solved by a network device which in particular is designed as a sensor or actuator and is intended for use in a communication network. The network device includes at least one wireless communication device which is designed for transmitting the data and/or for storing received data by energy received from a transmitting device, in particular energy received by induction. The wireless communication device comprises an ID memory operable by the received energy or is connected thereto, wherein at least one UAID (unified address identification), such as for example a local network or web address, a MAC ID, an eSIM ID or a combination thereof, can be stored in a non-volatile, readable and (over)writable manner and which can be read out, written to or overwritten by means of the wireless communication device. Furthermore, at least one non-volatile, readable, writable and overwritable operating memory is provided, in which operating data at least partially necessary for the operation of the network device can be stored.

The wireless communication device can be, in particular, an RFID TAG including an integrated chip and an RFID antenna, wherein the chip has an integrated memory or is connected to a memory element.

In an example, the ID memory can be an interface memory in which the UAID is stored. In this case, the interface memory is a memory area or a memory element that can be read out and modified both wirelessly via an air interface and by a connected microprocessor.

In the present context, the term "network device" shall be understood to mean, without limitation, in particular a module, a device, a component, a connector or a field device (actuator, sensor) of a communication network, such as for example for an automation process, such as in particular an IO-Link, SPE or a fieldbus system according to a corresponding standard or in a proprietary system.

In an example, the operating data of the operating memory can also be stored in a readable and (over)writable manner by energy received from the transmitting device, in particular energy received by induction.

In another advantageous example, the ID memory and the operating memory are a single memory element.

To prevent unintentional or malicious access to the ID memory and/or the operating memory, a two-stage access can be provided. Therefore, in a further example, it may be provided that at least one electronic switching element is provided, by means of which the connection to the ID memory of the wireless communication device can be switched, either by

- contactless received energy, in particular received energy by induction;
- a line-connected, higher-level component of the communications network; and/or
- a service device, in particular by a detection device.

In particular, the transmitting device can be a component of a service device and/or the detection device.

Also disclosed is a manufacturing method for a network device for use in a communications network, comprising:

- assembling the network device with mechanical, electrical and electronic parts and components, in particular with all parts required for the intended operation,
- storing, on the network device, at least a partial extent of the operating data of the network device required for the intended operation, wherein the partial extent of the operating data represents a primary configuration.

The following manufacturing steps are carried out:

- generating a UAID (unified address identification) for a network device,
- assigning this UAID to the network device,
- storing the UAID on an ID memory of the network device,
- storing the UAID, in particular together with at least one further network device information in a central process memory, wherein a defined secondary configuration is generated and stored in the central process memory for a UAID as a virtual secondary configuration, transferring of the virtual secondary configuration to a detection device, detecting the network device by the detection device, and wherein the primary configuration representing the secondary configuration on the network device is overwritten with the virtual secondary configuration.

The assembly of the network device can also be performed in an upstream manufacturing process and can be substantially performed in a provisioning as part of the described manufacturing process. In particular, the assembly can take place independently in time and with subsequent temporary storage.

The UAID generated for a physical network device is a unique code which is used to establish a link between the physical network device and, in particular, the operating data used there or to be used in the future. In this context, operating data of a network device is not to be understood in a restrictive manner and includes, for example, device data, application programs, boot programs and/or system programs. The device data and application programs are particularly significant here.

Primary configuration means a portion, a first extent, or a first type of operational data. In particular, the primary configuration is such that it provides no, or only a very incomplete, extent of use of the network device. Similarly, secondary configuration provides operational data of a type and extent that enables the intended use of a network device in a communication network. The primary configuration comprises in particular at least one boot program, at least one basic application and/or one basic function of the device.

Analogously, a virtual primary configuration or a virtual secondary configuration means the type and/or extent of operating data as described above, whereby the operating data are located in a process memory outside the network device. This process memory can be located, for example, in a cloud, a server, a PC or a mobile device, and in particular also in the detection device.

In this way, each network device can have a digital twin on the process memory that is linked via the UAID. This can be used to organize the provision of relevant data such as CAD drawings, manuals, configuration files, etc. Furthermore, each update can be made to the respective network device by preparing a virtual configuration on the process memory and subsequently replacing the respective configuration on the network device with the prepared configuration.

Furthermore, it may be advantageous if the UAID is also stored in a microprocessor and/or an attached memory of the network device to also allow access via the communication network, with additional storage in the ID memory of the wireless communication device.

It may be further advantageous to generate a unique unitary UAID at the time of assembly and to make this UAID dependent on a uniquely identified part, such as a unitary encoded and installed microprocessor, such that the presence of the microprocessor and/or its unitary identification represents and/or correlates to a UAID to be stored.

The secondary configuration is a, or a possible TARGET configuration, whereby further TARGET configurations can take place in an analogous manner after a secondary configuration, so that after a secondary configuration a tertiary configuration, quaternary configuration etc. takes place, and the respective associated virtual tertiary configuration, virtual quaternary configuration etc. takes place in advance on the process memory or a generated configuration is stored there.

An advantageous method variant can be that the primary configuration is stored in the central process memory together with the respective UAID, which thus form a (common) virtual primary configuration, whereby in particular this virtual primary configuration with further network device information and/or related data represent the virtual primary configuration.

The manufacturing method thus also represents a method for software updates and/or reconfiguration of the network device after initial commissioning. This can be done, for example, by a regular at least partially automatic request of the network device to a higher-level unit of the communication network. For example, the request can be made to the UAID of the process memory, whereupon a hash value for the configuration (software version numbers, etc.) is compared and, if necessary, a synchronization, i.e. a further (next) configuration, is initiated.

In this way, the current configuration status or version can be read out and checked in the process memory.

In a further example of the method, it can be provided that when or after the primary configuration on the network device is overwritten by the virtual secondary configuration for the secondary configuration, a security identifier dependent on the UAID is stored on the process memory, in particular a security identifier that represents an update of the UAID.

This security identifier can be provided, for example, by a suffix variation of the UAID, so that increased process reliability is established and the same network device is not written to several times with a configuration or the respective operating data that has already been transmitted.

In a variant of the manufacturing method, it may be provided that prior to overwriting the primary configuration with the virtual secondary configuration, the network device is stored at least temporarily at a fixed or mobile storage location and/or arranged at a destination within the communication network.

In this context, the term "arrange" also means, in particular, connecting the network device via a cable connection to an adjacent, for example higher-level component, such as an I/O card, an IO card, a gateway or a master module.

Thus, a basic type of network device can be produced at one location, for example, and provided with a primary configuration. Subsequently, storage or transport to the destination takes place. In the above second alternative, which can also follow the first alternative in terms of time, the network device is already integrated into the communication network with the primary configuration and is only then provided with the respective necessary secondary configuration. In this second alternative, it can be provided that the detection device also detects and stores the attachment location of the network device or the respective UAID via a suitable detection system, such as a geotracker, a detection of a neighbouring device or a manual input, and stores this information locally and/or in the process memory for the respective UAID.

In this way, the step of configuration with a secondary configuration is also used to control the communication network.

In a particularly advantageous variant of the manufacturing process, it may be provided that the primary configuration is such that the network device alone is hereby not operable in any complete mode of operation within the communication network and/or not operable by a higher-level component.

Such a primary configuration, which only includes trunk data or operating data for a minimum basic function, represents increased protection against theft or misuse. It is further suitable, in particular with additional control steps, for avoiding incorrect use if, for example, the transfer of the secondary configuration is only carried out by an employee who has a higher or a special qualification.

A further improvement may be that the transfer of the virtual secondary configuration to the network device as secondary configuration takes place as follows:

after installing and connecting to at least one higher-level component of the communication network and/or after supplying voltage and/or a wake-up command by at least one higher-level component of the communication network.

Thus, for example, an IO master or an I/O card can supply a basic voltage for the network device, which activates an electronic switching element if necessary, so that the ID memory can subsequently be written to. Independently of this, after the transmission of the operating data for the secondary configuration, an independent initialization step can take place.

In particular, the network device can check whether new operating data are available as a new configuration at the memory location after the network device (Power UP) and automatically reloads them.

Furthermore, the network device can provide its final UAID to a detection device and/or its environment, such as the warehouse, the user of the communication network, so that the environment can provide the network device with a final marking (identification), for example on an outer packaging.

The final configuration (identification) of the delivery and/or operating state must only be finally defined before commissioning (power up) and can be changed until then. This could concern, for example, the removal of bugs or the addition of special firmware functions.

In a further improved manufacturing method, after the UAID has been detected by the detection device, a label which can be applied to the network device can be generated, wherein the label has optically and/or machine-readable contents or data which correlate with at least one item of information of the network device, in particular with the secondary configuration and/or the UAID.

The label can be of any design, and in particular can be:

a printed label or, an RFID TAG carried by a self-adhesive file that can be written to by the detection device.

Here, at least part of the contents may be cryptographic or encrypted, in particular in the case of a printable label as a scannable code, such as a QR code, that can be read by a scanner.

It often makes sense in complex plants to provide redundant safety steps in order to establish independent verification steps.

Thus, an additional improvement of the manufacturing process can be made by requiring an enabling of the network device after the secondary configuration has been stored, in particular by a renewed (second) readout of the UAID, a readout of the security identifier, and/or a readout of at least part of the contents of the label.

In this context, readout means at least the storage of the data and information acquired in this way, but also in particular the automated comparison of the data and information with a stored TARGET or expected values. This evaluation can take place locally in the detection device or in a connected, central processing unit and/or a server or cloud application.

BRIEF DESCRIPTION OF THE DRAWINGS

The disclosure will now be described with reference to the drawings wherein.

DESCRIPTION OF EXEMPLARY EMBODIMENTS

Figure 1:
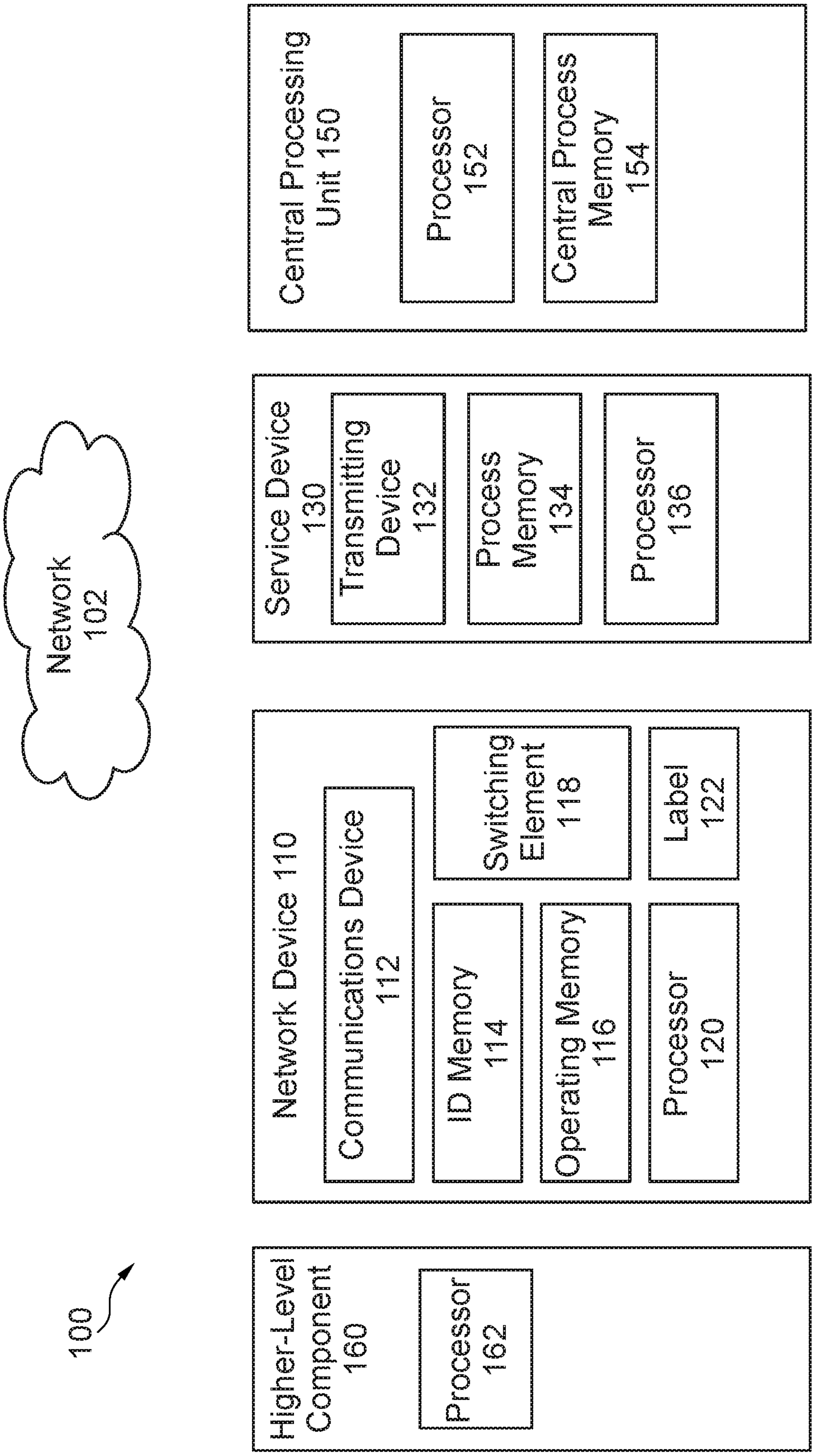
FIG. 1 is a block diagram of a communications network 100.

FIG. 1 shows an example communications network 100, optionally for an automation process. The communications network 100 includes a network 102 which provides wired or wireless communication between one or more network devices 110, one or more service devices 130, and one or more central processing units 150. The communications network 100 may further include one or more higher-level components 160. For ease of discussion, the communications network 100 will be described as including one network device 110, one service device 130, one central processing unit 150, and one higher-level component 160.

The network 102 provides communications between the network device 110, the service device 130, the central processing unit 150 and the higher-level component 160 and can be any type of a wired or wireless network such as IO Link, Single Pair Ethernet (SPE) or a fieldbus system. Communications with the network device 110 are typically performed by wireless communications through the service device 130, or by a hardwire connection of the network device 110 to the high-level unit 150. In some cases, the network device 110 may include provisions for direct connection to the network 102.

The network device 110 is designed, in particular as a sensor or actuator, and is intended for use in the communications network 100. It includes at least one wireless communications device 112 which is designed for transmitting data and/or for storing received data by energy received from a transmitting device, in particular energy received by induction. The transmitting device may be, for example, a transmitting device 132 included in the service device 130. As non-limiting examples, the network device 110 may be a module, a device, a component, a connector or a field device (actuator, sensor) of the communications network 100.

In an example, the network device 110 is an RFID TAG and can be an integrated chip and an RFID antenna, wherein the chip has an integrated memory or is connected to a memory element.

The wireless communications device 112 includes or is connected to an ID memory 114 which can also be operated based on the energy received by induction. The ID memory 114 stores at least one UAID (unified address identification), such as, for example, a local network address or web address, a MAC ID, an eSIM ID or a combination thereof. The ID memory 114 can store the UAID in a non-volatile, readable and (over)writable manner, and can be read out, written to, or overwritten by means of the wireless communications device 112.

In an example, the ID memory 114 can be an interface memory wherein a memory area or memory element can be readout and modified both wirelessly by a transmission device and alternatively by a connected microprocessor.

The wireless communications device 112 further includes a non-volatile, readable, writable, and overwritable operating memory 116, in which operating data necessary, or at least partially necessary, for operation of the network device 110 can be stored.

The ID memory 114 and operating memory 116 can be a single memory, and can further be included in, or connected to the communications device 112.

The network device 110 can further include a switching element 118. The switching element 118 can be an electronic switch. As described above, the switching element 118 can be configured to enable communications with ID memory 114 by: (1) contactless received energy, in particular energy received by induction, (2) a line-connected higher-level component such as the higher-level component 160, and/or (3) a service device such as the service device 130.

The network device 110 may further include a processor 120 to enable communications with the communications network 100 via the network 102. The processor 120, may for example, store the UAID associated with the network device 110 in a memory associated with the processor 120.

The network device 110 may further include a label 122. The label 122 may be a physical label, applied to the network device 110 that includes optically and/or machine-readable contents or data which correlate with at least one item of information of the network device 110. For example, the data contained by the label 122 may correlate with a secondary configuration of the network device 110, and/or the UAID. The label can be, for example, printed be a self-adhesive film, and printed by the service device 130. The contents can be cryptographic or encrypted, and in particular in the case of a printable label can be a scannable code, such as a QR code.

The service device 130 is configured for communications over the network 102 and includes a transmitting device 132, a processing memory 134 and a processor 136. In an example, the service device 130 is a detection device 130.

The transmitting device 132 can be a component of the service device 130 and is configured to wirelessly transmit data to the communications device 112 on the network device 110.

The processing memory 134 can receive store, for example, a virtual secondary configuration for the network device 110. In an example, the service device 130 maintains a digital twin of the network device 110 on the process memory 134 that is linked to the network device 110 via the UAID.

The processor 136 can be programmed to receive data, for example configuration data, and store the configuration data in the processing memory 134. The processor 136 can be further programmed, for example, to detect the network device 110, wherein the primary configuration representing the secondary configuration of the network device 110 is overwritten with the virtual secondary configuration.

The central processing unit 150 may be or included in a server and/or a cloud application. The central processing unit 150 includes a processor 152 and a central processing memory 154. As described below in reference to the process 200, the processor 152 may be programmed to perform steps related to the manufacture of the network device 110.

The central processing unit 150 may further, for example, store, a digital twin of the network device 110 on the central process memory 154 that is linked to the network device 110 via the UAID.

The higher-level component 160 may be an I/O card, an IO card, a gateway or a master module, configured for communications over the network 102, and can include a processor 162. In an example, the higher-level component 160 can be cable connected to the network device 110, thereby connecting the network device 110 to the communications network 100. As an example, in the case that the ID memory 114 on the network device 110 is configured as an interface memory, the processor 162 may connect to and communicate with the ID memory 114.

Figure 2:
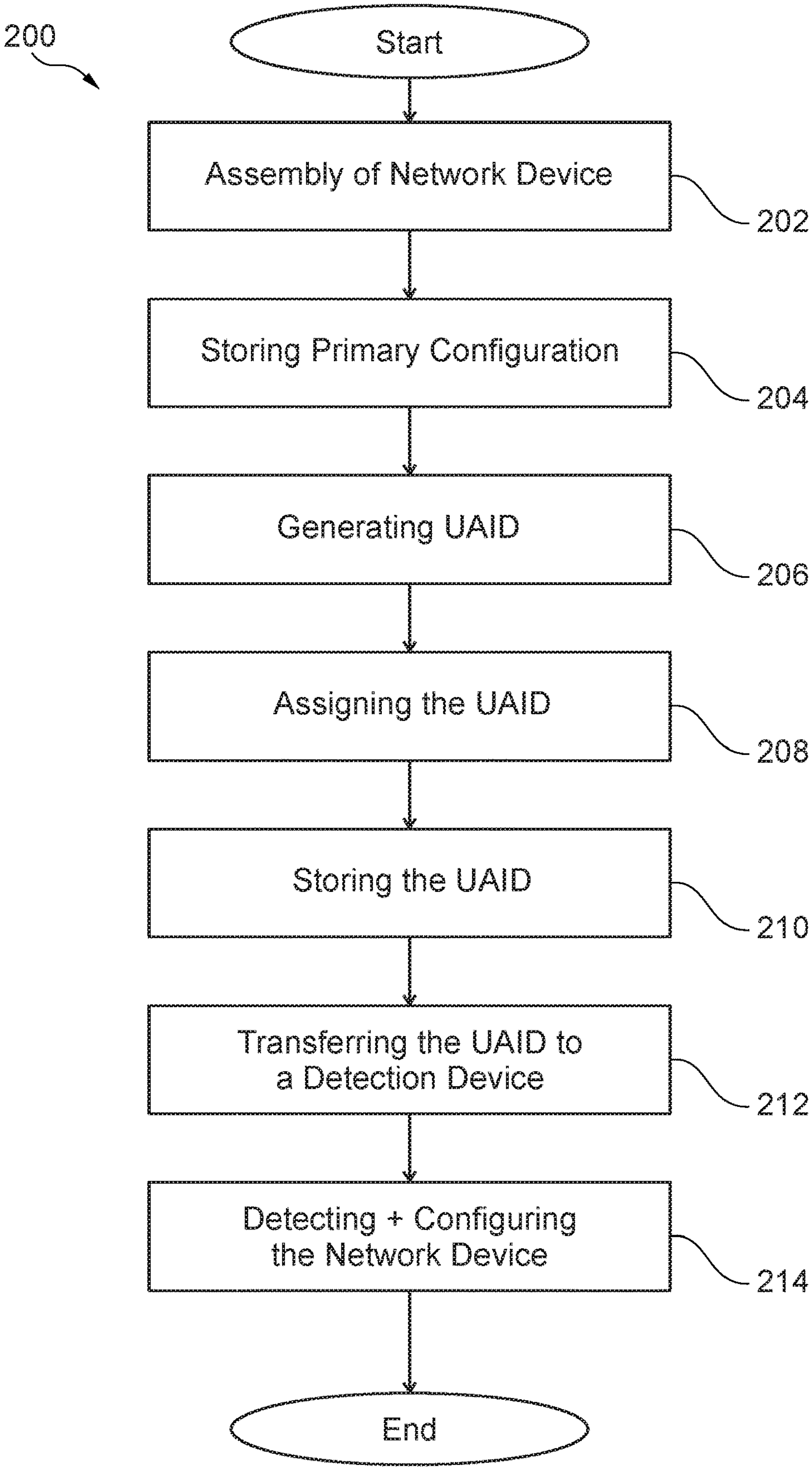
FIG. 2 is a flow diagram of an example manufacturing process for a network device 110 for use in the communications network 100.

FIG. 2 is a flow diagram of an example process 200 for manufacturing a network device 110 for use in the communications network 100. The example process begins in a block 202.

In the block 202, the network device 110 is physically assembled, including assembly of the mechanical, electrical, and electronic parts and components required for the intended use.

In a block 204, a partial extent of the operating data of the network device 110 is stored in the ID memory 114 and/or operating memory 116 of the network device 110.

In a block 206, a UAID is generated for the network device 110. For example, the processor 152 of the central processing unit 150 may generate the UAID, and store it in the central process memory 154.

In a block 208, the UAID is assigned to the network device 110. For example, the processor 152 of the central processing unit 150 may assign the UAID to the network device 110 and store the assignment in the central processing memory 154.

In a block 210, the UAID is stored, optionally together with at least one further information, such as a primary configuration for the network device 110, a device type, a date of manufacture or other date related information, in a central process memory, wherein a defined secondary configuration is generated and stored in the central processing memory for a virtual secondary configuration. For example, the processor 152 of the central processing unit 150 may store the UAID and further information in the central processing memory 154.

In a block 212, a secondary configuration is transferred to a service device 130 which can be a detection device 130. For example, the processor 152 of the central processing unit 150 may perform this transfer. The detection device 130 may store the secondary configuration in the process memory 134 of the detection device 130.

In a block 214, the detection device 130 detects the network device 110, wherein the primary configuration representing the secondary configuration on the network device 110 is overwritten with the virtual secondary configuration.

Overall, it may be advantageous to use any of the examples and variations of the network device described herein in any of the aforementioned variations of the manufacturing process.

Overall, a particular procedure and manufacturing steps are generally set forth herein in context and for the secondary configuration, and a respective analogous procedure is intended to apply to each additional virtual configuration in the process memory or each additional configuration on the network device in an analogous manner.

Furthermore, all aspects, advantages and combination possibilities described for the network device should also apply in an analogous manner to the manufacturing process and vice versa.

The invention claimed is:

1. A network device for use in a communications network, comprising:

at least one wireless communication device for transmitting data and/or for storing received data by energy received from a transmitting device, wherein:

the wireless communication device comprises an ID memory that is either connected to or is included in the wireless communication device, the ID memory being operable by the received energy;

the ID memory stores at least one UAID (unified address identification) in a non-volatile, readable and (over)writable manner;

the wireless communication device is configured to read out and (over)write the UAID stored in the ID memory; and at least one non-volatile, readable and (over)writable operating memory that stores operating data (configuration) of the network device, wherein the operating data (configuration) is at least partially necessary for the operation of the network device.

2. The network device according to claim 1, wherein the communications network is a communications network for an automation process.

3. The network device according to claim 1, wherein the energy received from the transmitting device is received by induction.

4. The network device according to claim 1, wherein the operating data is readably and (over)writably stored in the operating memory by the energy received from the transmitting device.

5. The network device according to claim 1, wherein the ID memory and the operating memory are a single memory element.

6. The network device according to claim 1, further comprising at least one electronic switching element; the at least one electronic switching element configured to switch the connection to the ID memory of the wireless communication device, by either:

contactless received energy;

a line-connected, higher-level component of the communication network; and/or a service device.

7. The network device according to claim 6, wherein the contactless received energy is received by induction.

* * * * *